US006240334B1

(12) United States Patent
Duke et al.

(10) Patent No.: US 6,240,334 B1
(45) Date of Patent: May 29, 2001

(54) BINDING AND FORMING PROCESSES UTILIZING PRE-PERSONALIZED COMPONENTS AND MEDIA INCORPORATING SUCH COMPONENTS

(75) Inventors: Dana Kipland Duke, Jefferson, GA (US); Ted J. Work, Effingham, IL (US)

(73) Assignee: Quebecor World (USA) Inc., Greenwich, CT (US)

(*) Notice: Subject to any disclaimer, the term of this patent is extended or adjusted under 35 U.S.C. 154(b) by 0 days.

(21) Appl. No.: 09/361,648

(22) Filed: Jul. 27, 1999

(51) Int. Cl.[7] .................................................... G06F 17/00

(52) U.S. Cl. .......................... 700/221; 700/219; 700/220; 270/1.02; 270/52.02; 270/52.04; 270/52.19

(58) Field of Search ............................... 270/52.02, 1.02, 270/52.05, 1.1, 1.03, 52.19, 52.04, 37; 700/219, 220, 221, 222

(56) References Cited

U.S. PATENT DOCUMENTS 3,819,173 * 6/1974 Anderson et al. ................ 270/52.04
3,917,252 * 11/1975 Harder et al. ..................... 270/52.05
5,114,128 * 5/1992 Harris, Jr. et al. .................. 270/1.03
5,143,362 * 9/1992 Doane et al. ......................... 270/1.1
5,186,443 * 2/1993 Manley et al. ...................... 270/1.02
5,314,176 * 5/1994 Schmitt ............................... 270/1.03
5,317,654 * 5/1994 Perry et al. .......................... 382/101
5,419,541 * 5/1995 Stevens ............................. 270/52.19
5,458,323 * 10/1995 Magee et al. ..................... 270/52.02
5,547,175 * 8/1996 Graushar et al. ...................... 270/37
5,838,574 * 11/1998 Olson et al. ......................... 700/219

* cited by examiner

*Primary Examiner*—Christopher P. Ellis
*Assistant Examiner*—Patrick Mackey
(74) *Attorney, Agent, or Firm*—Dean W. Russell; Kilpatrick Stockton LLP

(57) ABSTRACT

Methods and apparatus for personalizing printed media such as (but not limited to) catalogs, magazines, and books are disclosed. Personalized components are created before binding of the media occurs, reducing use of ink-jet printers on-line. At least the personalized components contain machine-readable indicia to permit identification and coordination of use of the components during the binding processes.

14 Claims, 4 Drawing Sheets

Fig. 7
(CONTINUED)
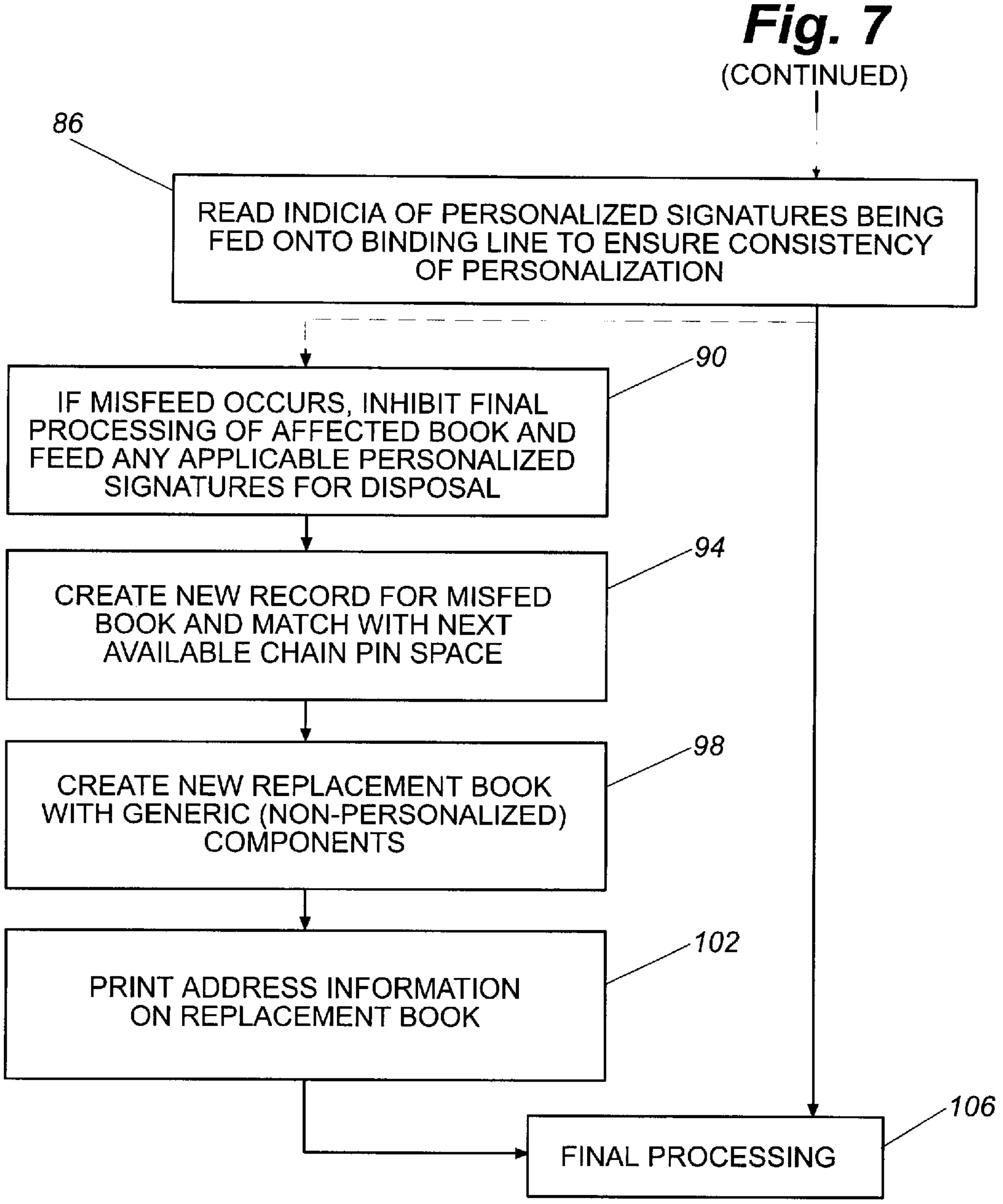
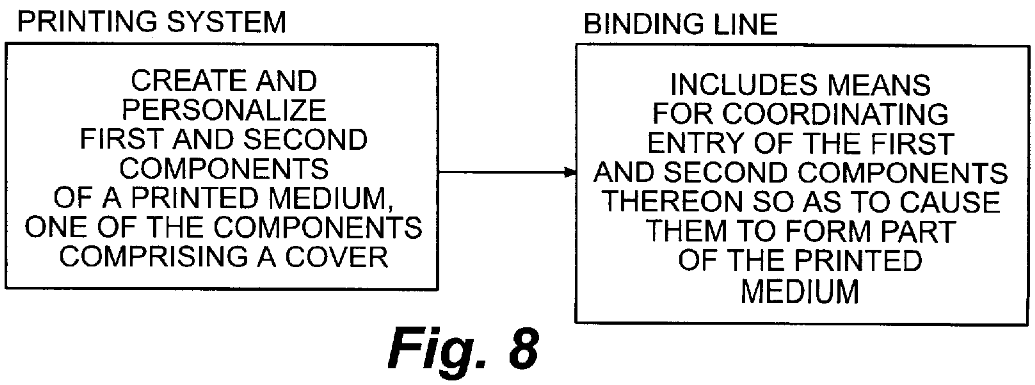
Fig. 8

BINDING AND FORMING PROCESSES UTILIZING PRE-PERSONALIZED COMPONENTS AND MEDIA INCORPORATING SUCH COMPONENTS

FIELD OF THE INVENTION

This invention relates to forming printed or similar media such as (but not limited to) catalogs, magazines, and books and more particularly to methods and processes of creating multiple personalized components of the media prior to their being combined with generic components.

BACKGROUND OF THE INVENTION

U.S. Pat. No. 5,114,128 of Harris, Jr., et al., incorporated herein in its entirety by this reference, discloses methods and apparatus "for incorporating pre-personalized signatures within magazines . . . which are intelligently matched to recipient name and address information printed on the covers of the magazines . . . " See Harris, Jr., Abstract, 11. 1–5.

As described therein:

It is often desirable to personalize magazines by printing information specific to the individual recipient inside the magazine. For example, an advertising page in the magazine might be personalized with the name of the recipient and the location of the dealer closest to the recipient's address. Personalization of this type is also widely used in the print media field, and is generally known as on-line personalization or ink-jet personalization—a term derived from the printing device customarily employed.

See id., col. 1, 1. 67 through col. 2, 1. 8.

To accomplish the intended results of its disclosed methods and apparatus, the Harris, Jr. patent describes processes involving "pre-personalizing off-line signatures with personalization information including machine readable indicia." These signatures are then loaded into binding-line hoppers and deposited between "chain pins" on conveyors. A symbol-reading device deciphers the indicia and generates the name and address of the recipient of each printed document and, using an ink-jet printer forming part of the binding line, prints the address information on the cover signature of that particular document. See id., col. 6, 11. 45–63.

Conventionally, personalization of printed documents such as magazines or catalogs has been restricted to an area of a central insert (such as an order form or advertising page) and, as discussed in the Harris, Jr. patent, the cover. Size, space, and speed limitations relating to binding lines and ink-drying times, in particular, preclude effective use of on-line ink-jet printers for personalizing documents beyond creating relatively few characters of address or other information. Thus, traditional magazines and catalogs made in high-volume binding lines contain little true personalization of their contents.

SUMMARY OF THE INVENTION

The present invention, by contrast, admits substantially greater personalization of the contents of printed or similar media (sometimes generically referred to herein as "books") formed on a binding line. Useful regardless of binding-line type (whether "stitching" or "perfect binding," for example, "selective" or "non-selective," or "custody" or "non-custody"), the invention contemplates off-line preparation of both personalized signatures and covers, unlike the methods of the Harris, Jr. patent. These personalized components are encoded with indicia to permit their identification and coordination of their use. Because created entirely off-line, they additionally can be examined (electronically or otherwise) before entering the binding line to ensure their correct sequencing and number.

In embodiments of the invention utilized in connection with selective-binding processes, a computerized file used to produce the pre-personalized components likewise can function as the basis for the master driver file for the bindery controller. After establishing for the controller appropriate configurations for the media to be created, the controller is provided information identifying which signature is in each particular "pocket" (area) of the line. Indicia present on each personalized signature in a pocket may be read (either before, as, or after the signatures enter the pocket) to form a computerized buffer containing records of each signature. Typically, the number of available records in the buffer will exceed the number of chain pins for the binding lines, allowing creation of new records on-line (and consequent production of "omits" or "re-order" books) to account for binding errors. Because production of a relatively generic omit book can occur utilizing the next available chain pin space, it often can remain in the same mail or zip-code batch as was originally intended.

Indicia on personalized signatures may be read again as each signature enters a chain pin space of the binding-line conveyor. Verification of the indicia in an appropriate buffer record permits the master driver file to control selective feeding of other appropriate signatures into that space. The result is a printed medium which may contain either or both of one or more pre-personalized and generic components, with feeding of the pre-personalized signatures having been coordinated so that all personalization is consistent for the intended recipient of the medium.

A typical computerized record for a printed medium may contain fields detailing the "book number" of the medium, its chain pin location, and both demographic and address-related information of the intended recipient. In selective binding processes, such demographic information is often expressed in terms of which of the available signatures will be used to make a particular medium. Whereas a first recipient may receive the first, third, and fifth available signatures, for example, a second recipient might instead receive the first, second, and fourth signatures. Yet another recipient might receive only the third and fourth signatures. In each case, the types of signatures received by the recipient depends, at least in part (and either directly or indirectly), on information about her or him. In the present invention, additional fields in each record link the information to locations of pre-personalized signatures prepared to enter the binding line.

It is therefore an object of the present invention to provide off-line, pre-personalization of both covers and other components of printed media formed on a binding line.

It is an additional object of the present invention to enhance the area available for personalized information in media prepared on high-speed binding lines by performing the personalization off-line.

It is another object of the present invention to provide methods and apparatus for coordinating use of multiple personalized signatures or components intended to appear in a single medium directed to a particular recipient.

It is a further object of the present invention to provide methods and apparatus for recognizing the existence of certain defects in particular media and re-ordering production of relatively-generic replacement media (omits).

It is also an object of the present invention to avoid use of ink-jet printers on the binding line (except, perhaps, to print name and address information on omits).

It is yet another object of the present invention to provide and maintain computerized records of locations of personalized components both before and after (or as) such components enter a binding line.

Other objects, features, and advantages of the present invention will become apparent with reference to the remainder of the text and drawings of this application.

BRIEF DESCRIPTION OF THE DRAWINGS

FIG. 8 is a block diagram representing a printing system and binding line useful in connection with the present invention.

DETAILED DESCRIPTION

Figure 1:
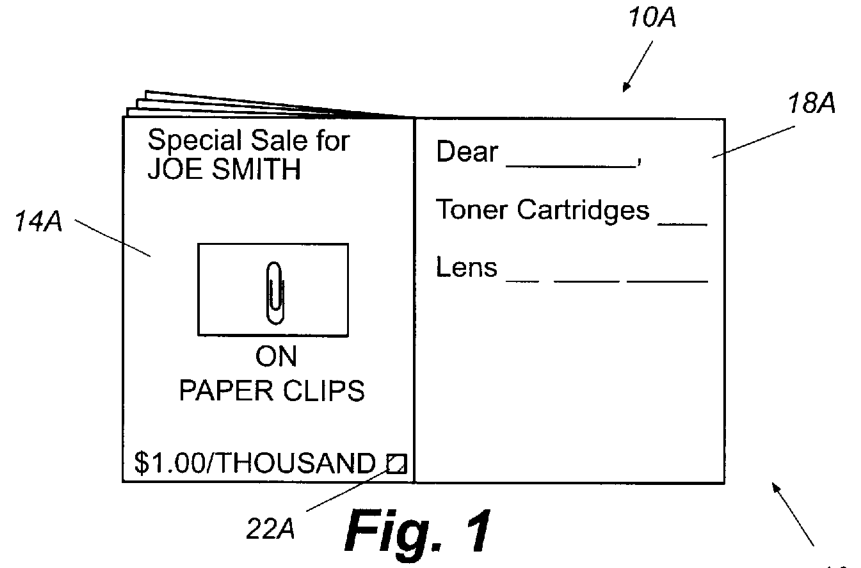
FIG. 1 is an exemplary, pre-personalized signature bearing information personal to a (fictitious) person named "Joe Smith."

Illustrated in FIG. 1 is an exemplary signature 10A useful for forming a personalized direct-mail catalog for a person named Joe Smith. Signature 10A is not limited to use in connection with a catalog, however, and alternatively may form a portion of a magazine, book, or other printed medium or thing. Like conventional signatures, signature 10A may form one or more pages of a printed medium. Unlike conventional signatures used in binding lines, however, signature 10A has been created and personalized off-line, expanding the flexibility and extent to which it can include personalization.

As shown in FIG. 1, for example, signature 10A may include an entire page designed to promote a sale tailored specifically to Mr. Smith, who in this example is known to be a frequent purchaser of large volumes of paper clips. Accordingly, visible page 14A of signature 10A depicts a paper clip and links Mr. Smith's name to a special sale and price for the clips. Although visible page 18A of the signature 10A shows generic information about various office supplies, other pages of signature 10A may include additional information bearing Mr. Smith's name (or otherwise personalized for him).

Figure 2:
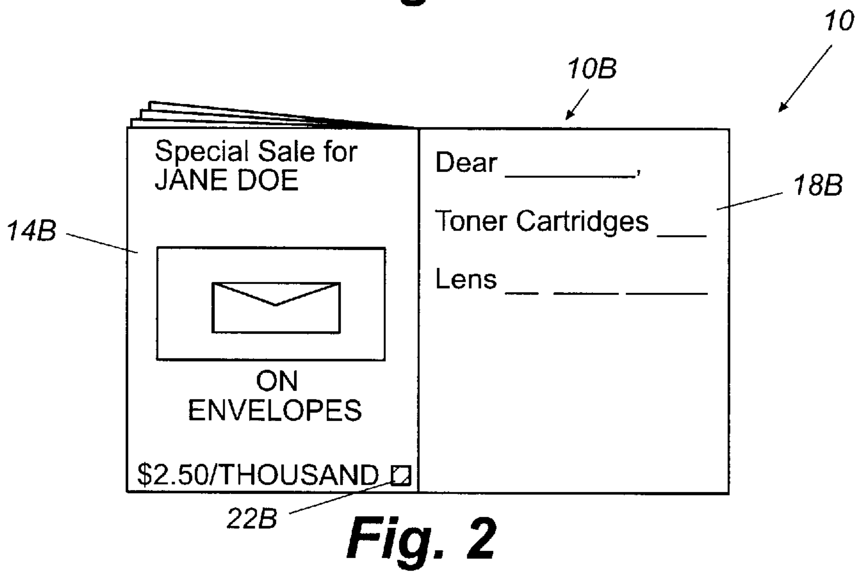
FIG. 2 is an exemplary, pre-personalized signature bearing information personal to a (fictitious) person named "Jane Doe."

FIG. 2 illustrates a signature 10B whose visible page 14B promotes a sale tailored specifically for a (fictitious) person named Jane Doe believed likely to respond favorably to reduced prices for envelopes. By contrast with that of page 14A, therefore, the information on page 14B links Ms. Doe's name to a depiction of an envelope and the relevant pricing information. Page 18B may be the same as page 18A if desired to present to Ms. Doe generic information about other office supplies, and various other pages within signature 10B may either be personalized or generic as desired. Signatures 10A and 10B nevertheless form part of the same signature set 10 for purposes of this explanation, as the personalization described herein applies in connection with (and is different from) arguable "personalization" available through use of conventional selective binding methods. In other words, although some arguable "personalization" may be achieved by selectively including or omitting generic signatures from certain of the media, it differs from the true personalization achievable through use of the present invention.

Included on each of respective pages 14A and 14B is machine-readable indicia 22A and 22B. Indicia 22A may contain as much information as desired about Mr. Smith and signature 10A; at minimum, however, it includes information sufficient to facilitate signature 10A being incorporated into a medium containing other signatures, if present, personalized for Mr. Smith (and usually only Mr. Smith). Similarly, indicia 22B contains at least such information respecting Ms. Doe. Because intended to be read by machine, the information of indicia 22A and 22B may be encoded and not intelligible by mere visual examination.

Figure 3:
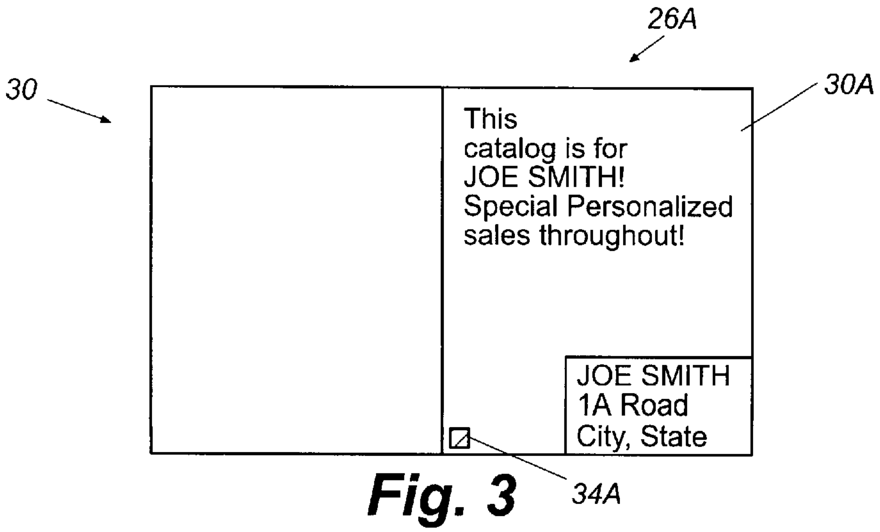
FIG. 3 is an exemplary, pre-personalized cover signature bearing information personal to the Mr. Smith referenced in the description of FIG. 1.
Figure 4:
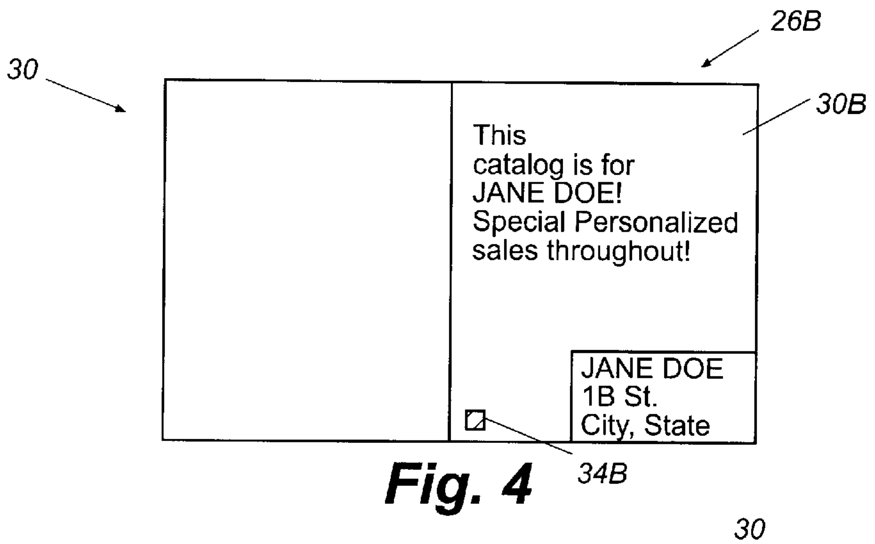
FIG. 4 is an exemplary, pre-personalized cover signature bearing information personal to the Ms. Doe referenced in the description of FIG. 2.

FIGS. 3–4 represent cover signatures 26A and 26B, respectively. Like signatures 10A and 10B, cover signatures 26A and 26B may contain personalized information (such as shown on visible cover pages 30A and 30B) and, for purposes of this explanation, are part of the same cover signature set 30. Cover signature 26A, for example, includes text informing Mr. Smith that the catalog is made especially for him; it additionally includes Mr. Smith's name and mailing address. By contrast, cover signature 26B identifies a catalog as having been created especially for Ms. Doe and contains her name and mailing address on page 30B. Unlike the ink-jet addressing of the signatures of the Harris, Jr. patent, however, personalization of cover signatures 30A and 30B is designed to occur off-line and need not (although possibly could) involve use of ink-jet printers.

Indicia 34A and 34B appear on signatures 26A and 26B. Similar to indicia 22A, indicia 34A may include information sufficient to facilitate signature 30A being incorporated into a medium containing other signatures, if present, personalized for Mr. Smith (and usually only Mr. Smith). Indicia 34B facilitates signature 30B being incorporated into a medium containing signatures personalized, typically, only for Ms. Doe.

Customarily, therefore, the catalog received by Mr. Smith will include personalized signatures 10A and 26A and exclude signatures 10B and 26B, while that sent to Ms. Doe will include personalized signatures 10B and 26B (but not signatures 10A and 26A). Coordination of use of signatures 10A, 10B, 26A, and 26B is thus important to forming the catalogs correctly. This is particularly true given that production of the signatures 10A, 10B, 26A, and 26B may occur at a site remote from the binding line, requiring extensive handling—and consequent opportunity for mishandling—of them before they are fed onto the binding line conveyor.

Figure 6A:
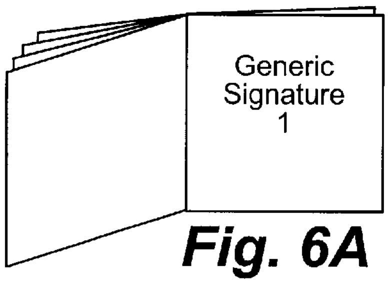
FIGS. 6A–C schematically depict generic signatures for use in connection with those of FIGS. 1–5.
Figure 6B:
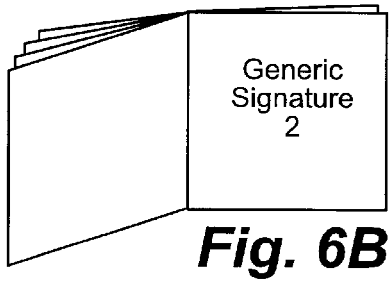
Figure 6C:
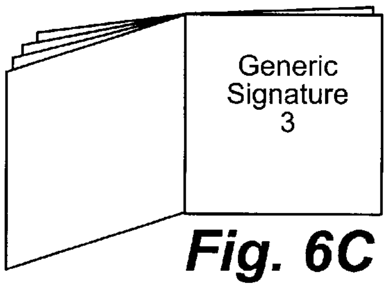

FIGS. 6A–C depict exemplary generic signatures GS1, GS2, and GS3, some or all of which also may be included in catalogs received either by Mr. Smith, Ms. Doe, or both. If selective binding techniques are employed, for example, Mr. Smith may receive a catalog containing signatures GS1 and GS2 in addition to personalized signatures 10A and 30A. Demographic data respecting Ms. Doe may dictate she receive a catalog containing signatures GS2 and GS3 as well as personalized signatures 10B and 30B. Those skilled in the art will, of course, recognize that many other combinations of signatures or components are possible and greater or fewer numbers of signatures may be incorporated into any particular printed medium.

Figure 7:
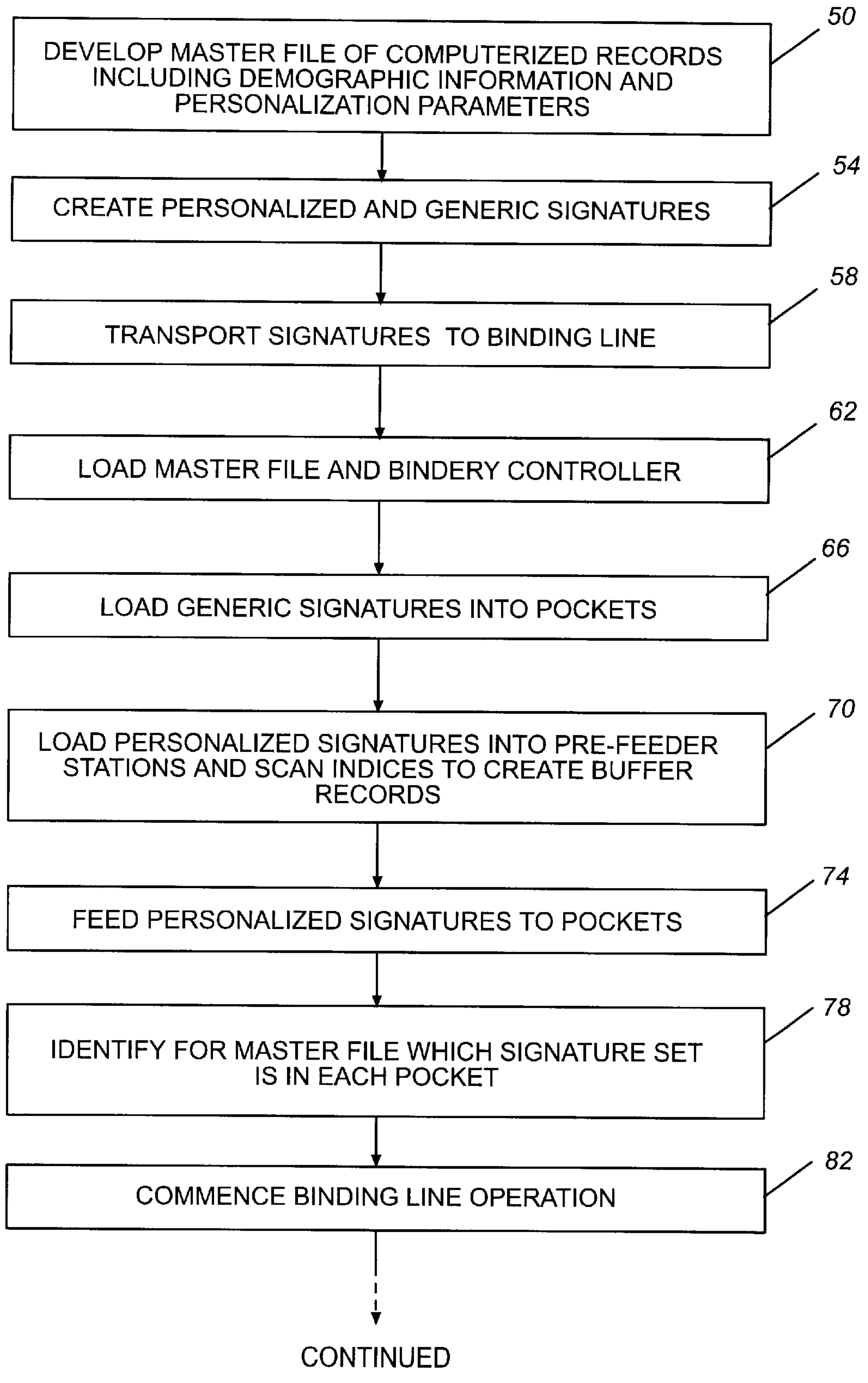
FIG. 7 is a flow chart detailing exemplary actions and operations forming or consistent with the present invention.

Shown in FIG. 7 is a chart describing actions which may occur in connection with the present invention. Initially, a computerized mailing list is developed or obtained (block 50). Such list often includes names, corresponding addresses, and both demographic data and information sufficient to allow sorting of finished products by zip code or to be consistent with postal service guidelines or regulations. (Not all this data and information need necessarily be present, however, and other types of information might also be included.) The list as well may serve as the basis for the master file of computerized records associated with the binding process.

Utilizing the list as appropriate, suitable numbers of personalized and generic signatures of a particular medium may be created (block 54). In accordance with the invention, some or all personalization occurs before the signatures enter the binding line. This allows printing techniques other than use of small, on-line ink-jet printers to be employed, vastly increasing the amount of personalization available in each signature. (In fact, each page of each signature can be personalized if desired.) It also allows the personalized signatures to be created other than at the binding line, which could be valuable especially if the binding line is unavailable temporarily or otherwise in use.

Following their creation, the personalized and generic signatures may be transported to the binding line (block 58) if necessary and the master file loaded into the bindery controller (block 62). Usually, generic signatures are loaded into pockets of the line (block 66); personalized signatures are loaded into pre-feeder stations or areas where indicia corresponding to indicia 22A, 22B, 34A, and 34B are scanned or otherwise read by machine to create a set of buffer records (block 70) from which the integrity of each medium may be verified. The sequence in which personalized signatures are loaded for entry onto the binding line is especially significant, as knowledge of it helps coordinate use of the multiple signatures and match those intended for each particular recipient of the printed medium.

Each set of personalized signatures is then fed to its assigned pocket (block 74). The binding line operator, who has made the assignments of both the personalized and generic signatures, then informs the controller of the mapping between the pockets and particular types of signatures (block 78). If no discrepancies in the sequence and location of signatures is detected, operation of the binding line thereafter can commence (block 82).

As a simple example, assume one hundred catalogs are to be created, the first twelve of which are for residents (including Mr. Smith and Ms. Doe) of a town who have the same zip code (and perhaps even the same postal carrier). Master records for Mr. Smith, Ms. Doe, and others may be exemplified as follows:

| Book | Chain_Pin | GS1 | GS2 | GS3 | 10 | 30 | Name | Address |
|---|---|---|---|---|---|---|---|---|
| 1 | A | X | X | | 1 | 1 | Joe Smith | 1 A Road |
| 2 | B | | X | X | 2 | 2 | Jane Doe | 1 B Street |
| . | . | . | . | . | . | . | . | . |

-continued

| Book | Chain_Pin | GS1 | GS2 | GS3 | 10 | 30 | Name | Address |
|---|---|---|---|---|---|---|---|---|
| . | . | . | . | . | . | . | . | . |
| . | . | . | . | . | . | . | . | . |
| 11 | L | X | X | X | 11 | 11 | Bob Jones | 9 A Road |
| 12 | M | X | | X | 12 | 12 | Ted Lee | 7 B Street |
| . | . | . | . | . | . | . | . | . |
| . | . | . | . | . | . | . | . | . |
| . | . | . | . | . | . | . | . | . |

According to the first record, the first "book" (catalog) will be created in a chain pin space designated as "A" and is for Mr. Smith of 1 A Road in the town. It will contain non-personalized signatures GS1 and GS2 as well as the first signature fed from the set of each of personalized signatures 10 and cover signatures 30. Depending on the physical locations of the pockets along the binding line, additional information about the sequence in which signatures GS1, GS2, 10, and 30 are fed onto chain pin space "A" may be included in the record. Regardless, however, in this example signatures GS1, GS2, 10, and 30 form a catalog containing both personalized information (within signatures 10 and 30) and selective information, the latter being because only two (GS1 and GS2) of the three possible generic signatures are included in the catalog.

The second record appearing above identifies the second "book" as being created in chain pin space "B" and being for Ms. Doe of 1B Street in the town. It includes generic signatures GS2 and GS3 together with the second signatures fed from each set of personalized signatures 10 and 30. The eleventh and twelfth records shown above likewise provide information about catalogs to be prepared for Messrs. Jones and Lee. If the buffer records do not indicate sequences of personalized signatures 10 and 30 in which those for Mr. Smith are fed first, followed by those for Ms. Doe, and with those for Mr. Jones fed eleventh and those for Mr. Lee fed twelfth, an error condition may be announced and binding prevented until the sequence of personalized signatures is changed.

If indicia 22 or 34 of each signature 10 and 30 is re-scanned or -read upon entry onto the line (block 86), integrity of the coordination can be checked. Continuing with the example above, although chain pin spaces A-I and K-L are already assigned, chain pin space "J" temporarily is unassigned. If personalized signature 10B for Ms. Doe misfeeds into chain pin space "B" so that indicia 22B cannot be read properly, the error condition can be such that the line continues to operate but with knowledge that Ms. Doe's personalized book is ruined. The bindery controller can proceed automatically to direct into chain pin space "B" all other signatures (including cover signature 30B) personalized for Ms. Doe in order to dispose of all such signatures (block 90) and to create a new record requesting that an "omit" book be made for Ms. Doe (block 94). The omit book typically would not contain any of the pre-personalized signatures but rather would include only generic signatures (block 98), although the generic signatures could be imaged and selective binding techniques could continue to be employed so that Ms. Doe receives only selected ones of the available generic signatures. Moreover, because chain pin space "J" is unassigned in the example, Ms. Doe's remade book can be formed in that space, in the midst of those being routed to her zip code or postal carrier.

Thus, the one hundred first record in this example might read, at least in part:

| Book | Chain_Pin | GS1 | GS2 | GS3 | 10 | 30 | Name | Address |
|---|---|---|---|---|---|---|---|---|
| 101 | J | | X | X | X | X | Jane Doe | 1 B Street |

Figure 5:
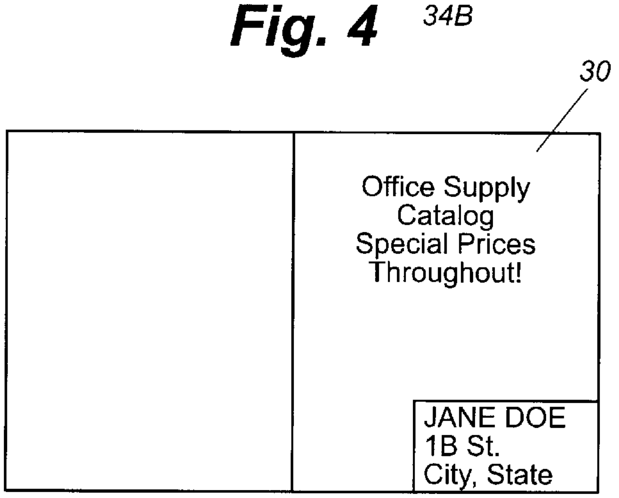
FIG. 5 is an exemplary, generic cover signature to which address information has been added personal to the Ms. Doe referenced in the description of FIG. 3.

According to this record, Ms. Doe would continue to receive a catalog made of generic signatures GS2 and GS3 (but not GS1). Rather than having the personalized signatures from the sequences of signatures 10 and 30, however, she will receive generic ones of these as well. Because in this example signature 30 is the cover signature, the re-ordered book for Ms. Doe will not have any pre-printed address information. Instead, an on-line ink-jet (or other) printer, or a labelling system, can be used to print or provide such information for Ms. Doe on a generic cover signature 30 (block 102), as shown in FIG. 5. This does, however, represent the only type of situation in which printing needs to occur as part of the binding line, avoiding the disadvantages associated with performing substantial amounts of such printing on-line.

If either the original catalog or remade book is acceptable, it may travel to one or more additional stations for final processing (block 106) and transport or mailing. The invention thus provides methods and apparatus for pre-personalizing mass quantities of printed media, validating the integrity of the media during its creation on a binding line, and correcting certain errors without disrupting either the line itself or the formation sequence. Although the foregoing is provided for purposes of illustrating, explaining, and describing embodiments of the present invention, modifications and adaptations to these embodiments will be apparent to those skilled in the art and may be made without departing from the scope or spirit of the invention.

What is claimed is:

1. A method of forming a printed medium on a. binding line, comprising:

a. pre-personalizing off-line a first component of the printed medium, the first component comprising a cover of the printed medium;

b. pre-personalizing off-line a second component of the printed medium; and c. coordinating entry of the first and second components onto the binding line so as to cause them to form part of the printed medium.

2. A method according to claim 1 in which pre-personalizing off-line the first component of the printed medium comprises printing address information thereon.

3. A method according to claim 2 in which pre-personalizing off-line the first component of the printed medium comprises printing at least one machine-readable indicium thereon.

4. A method according to claim 2 further comprising creating a computerized record including information relating to locations of entry points of the first and second components along the binding line.

5. A method according to claim 3 further comprising reading the at least one machine-readable indicium and creating a computerized buffer record before the first component enters the binding line.

6. A method according to claim 5 further comprising rereading the at least one machine-readable indicium as or after the first component enters as the binding line.

7. A method according to claim 1 further comprising detecting a misfeed of either the first or second component onto the binding line and creating a computerized record controlling reformation of the printed medium with a non-personalized component as a substitute for at least the misfed component.

8. A method according to claim 7 further comprising personalizing on-line the non-personalized substitute component.

9. A method according to claim 1 further comprising creating at least two non-personalized components and selectively causing at least one of the non-personalized components to form part of the printed medium.

10. A method according to claim 1 further comprising pre-personalizing off-line a plurality of third components and coordinating their entries onto the binding line so as to cause them to form part of the printed medium.

11. A system for forming a printed medium comprising:

a. a printing system for creating and personalizing first and second components of a printed medium, one of the first and second components comprising a cover of the printed medium; and b. a binding line separate from the printing system and comprising means for coordinating entry of the first and second components thereon so as to cause them to form part of the printed medium.

12. A printed medium formed on a binding line and comprising:

a. a first component containing information personal to the intended recipient of the printed medium, the personalized information having been included in the first component prior to its entry on the binding line; and b. a second component containing information personal to the intended recipient of the printed medium, the personalized information having been included in the second component prior to its entry on the binding line, one of the first and second components comprising a cover of the printed medium and entry of the first and second components onto the binding line having been coordinated to ensure their formation into the printed medium.

13. A printed medium according to claim 12 in which at least some of the personalized information included in the first and second components was created by an apparatus other than a binding line ink-jet printer.

14. A method of forming a printed medium on a binding line, comprising:

a. pre-personalizing off-line a first component of the printed medium;

b. pre-personalizing off-line a second component of the printed medium; and c. coordinating use of the first and second components on a selective binding line.

* * * * *